United States Patent [19]

Seth et al.

[11] Patent Number: 5,395,685
[45] Date of Patent: Mar. 7, 1995

[54] GYPSUM BOARD COMPRISIING LININGS MADE OF GLASS FIBER NON-WOVENS COATED WITH AN INORGANIC CEMENT BINDER

[75] Inventors: Harro Seth, Iphofen; Gerhard Neuhauser, Kitzingen; Claus-Peter Berneth, Marktbreit, all of Germany

[73] Assignee: Gebruder Knauf Westdeutsche Gipswerke KG, Iphofen, Germany

[21] Appl. No.: 554,908

[22] Filed: Jul. 20, 1990

[30] Foreign Application Priority Data

Nov. 10, 1989 [DE] Germany .................. 39 37 433.5

[51] Int. Cl.⁶ .................. B32B 5/16; B32B 15/00; B32B 13/00
[52] U.S. Cl. .................. 428/283; 428/284; 428/285; 428/288; 428/703
[58] Field of Search ............... 428/703, 285, 286, 283, 428/284, 288; 524/4, 5

[56] References Cited

U.S. PATENT DOCUMENTS 4,494,990  1/1985  Harris .

FOREIGN PATENT DOCUMENTS 2022503  12/1979  United Kingdom .

*Primary Examiner*—James D. Withers
*Attorney, Agent, or Firm*—Jacobson, Price, Holman & Stern

[57] ABSTRACT

A gypsum board comprises linings made of coated non-woven fiberglass mats having surfaces turned away from the gypsum core of the fiberglass mats which have been coated with an inorganic binder at least partially set with water. Preferably, quick-setting mixtures comprising cement, α-hemihydrate and ultra-fine silica are used which are dimensionally stable during setting as well as later on.

4 Claims, No Drawings

GYPSUM BOARD COMPRISIING LININGS MADE OF GLASS FIBER NON-WOVENS COATED WITH AN INORGANIC CEMENT BINDER

BACKGROUND OF THE INVENTION

The present invention relates to a gypsum board comprising linings made of coated non-woven fiberglass mats, to processes for producing same and to the coated non-woven fiberglass mats in roll form, used as intermediates in the production of gypsum board of the invention.

Gypsum boards comprising linings of non-woven fiberglass fabrics (non-woven mat) are non-combustible and, hence, may also be used in interior work where it is convenient or required to employ non-combustible building materials. Gypsum boards lined with fiberglass mats have already proven their usefulness. However, a disadvantage inherent in these boards is that upon working with these boards an abrasion of glass fibers may occur which may be rather inconvenient, especially when working overhead. This abrasion may be avoided if the outer surface of the non-woven fiberglass mat has been coated with paper, which may be conventionally adhered by using a synthetic resin binder. Such gypsum boards may be produced in a conventional band line used for gypsum wallboard manufacture. However, because of their paper coating, these building boards have been classified (e.g., in Germany) neither as building material of class A1-DIN 4102 (non-combustible) nor as non-combustible according to ISO-IS 1182-1979. Upon testing in the furnace at 750° C., ignition occurs. Such boards further have a relatively low air and/or steam permeability.

German Patent Application DE 35 08933-A discloses non-combustible gypsum boards comprising a glass fiber layer, wherein a finely divided inorganic material has been uniformly distributed on the outer surface of the glass fiber layer, which material changes with energy consumption under the action of heat. As specific inorganic materials there have been mentioned gypsum (calcium sulfate dihydrate), limestone, dolomite or magnesite, and substances expanding under the action of heat such as vermiculite and perlite. One drawback inherent in these non-combustible boards is that this additional coating with the finely divided inorganic material can be effected only with the use of an organic synthetic resin binder, such as a synthetic resin dispersion. The synthetic resin binders first must be applied onto the non-woven fiberglass mats, followed by coating with the inorganic material and adhesion-bonding. Only upon complete setting of the binder can the fiberglass mat be wound up and conveyed to the band line for making gypsum building boards.

SUMMARY AND DETAILED DESCRIPTION OF THE INVENTION

Thus, an object of the invention is to develop a non-combustible gypsum board comprising linings made of coated non-woven fiberglass mats. A board according to the invention is easily and readily producible and meets all of the requirements set for such a board. Advantages of a board of the invention include, more particularly, the absence of glass fiber abrasion, good coatability, non-combustibility and, in comparison to gypsum wallboard, lower sensitivity to moisture.

A non-combustible gypsum board can be attained in a surprisingly easy manner by coating the surfaces turned away from the gypsum core of the fiberglass mats with an inorganic binder which has at least partially set with water.

The inorganic binders settable with water include calcium sulfate hemihydrates, quick-setting cement or a quick-setting cement mixture. In the simplest case, quick-setting α-hemihydrates or β-hemihydrates or mixtures thereof may be used.

Furthermore, a cement according to DIN 1164 may also be employed, namely Portland cement, iron Portland cement, Portland blast-furnace cement, or trass cement, as such or in mixtures. Because of the direct vicinity to calcium sulfate of this cement layer in the plaster building board, however, it is preferable to employ a highly sulfate-resistant cement. These sulfate-resistant cements include fly-ash cement as well as quick-setting cements comprising 70-90% of Portland cement and 10-30% of aluminous (high-alumina) cement. Especially preferred are quick-setting cements and quick-setting cement mixtures which previously, in the dry state, consisted of at least 37% by weight of a cement, up to 60% by weight of α-hemihydrate and 3-10% by weight of ultra-fine silica plus, if desired, up to 2% by weight of liquefier/plasticizer, retardant and/or accelerator.

Optimum results are achieved with the use of a mixture comprising 40 to 60 parts by weight cement with low content of aluminate (<3% of $C_3A$ according to DIN 1164), 40 to 60 parts by weight of α-hemihydrate from flue gas gypsum and 3 to 10 parts by weight of reactive $SiO_2$, plus, if desired, up to 2% by weight of liquefier/plasticizer, retardant and/or accelerator. This quick-setting mixture is highly sulfate-resistant and is dimensionally stable during setting as well as during the aging process over a long period of time. While neat cement compositions tend to shrink in the course of setting, the preferred mixtures are dimensionally stable during setting. In contrast to the known mixtures of cement and gypsum, the mixtures of the invention, due to the addition of ultra-fine silica, are dimensionally stable even upon stress by temperature and moisture over a long time, since they do not tend to form ettringite. The preferred cement compositions are subject matter of the German Patent DE 3937432-A, the disclosure of which is hereby incorporated by reference.

The inorganic binders are mixed with water and applied to the fiberglass mat. In the course thereof it is possible, although not necessary, to additionally add an organic synthetic resin binder. Due to the addition of organic synthetic resin binders the initial adhesion may be accelerated. Nevertheless, the final adhesion is always predominantly caused by the inorganic binder. The fiberglass mat, having been thus coated, after a short time can be dried, wound up, transported and used for making the gypsum boards of the invention. If the setting process has not yet been completed in the wound-up fiberglass mat, further setting may occur during the manufacture of the gypsum board. Even if then the setting process of the inorganic binder has not yet come to an end, this will occur no later than upon moisture stress of the final plaster building board. More particularly, for the preferred mixtures comprising cement and α-hemihydrate from flue gas gypsum it has been shown that the setting process will proceed at a rate to provide the finished gypsum board with excellent properties. Upon subsequent completion of setting of the cement mixture by moisture stress, neither volume alterations, efflorescences, cracks nor deteriorations in the mechanical properties are encountered. A criterion for the stressability of such gypsum boards is the sagging of horizontally suspended boards in moist chambers. It has been shown that the gypsum boards of the invention exhibit properties essentially improved over those of all gypsum boards known so far.

The manufacture of the gypsum boards according to the invention is carried out by a method wherein first the fiberglass non-woven mats are coated with a settable mixture comprising an inorganic binder and water; the resulting mats, after setting has at least partially taken place, are wound up, and then the uncoated surface thereof is contacted with a settable pasty mixture comprising stucco and water so that this mixture will only partially infiltrate the fiberglass mat whereupon, after the gypsum has set, a gypsum board is formed which has been lined with the fiberglass mat thus coated.

It is of course possible to apply the lining to one surface or to both surfaces of the board. It is preferred to produce gypsum boards of the invention which have been lined on both surfaces thereof.

The gypsum boards of the invention, like the gypsum wallboard known so far, can be manufactured in different thicknesses. The lining is generally produced with a non-woven mat substrate which has an area weight of from 100 to 140 g/m$^2$. The coating with the inorganic binders is done so that the area weight of the coated lining is increased to from 200 to 350 g/m$^2$. It has been shown that, in particular upon use of the preferred mixtures comprising sulfate-resistant cement, $\alpha$-hemihydrate and reactive $SiO_2$, lower area-related weights are attainable, though nevertheless excellent results are achieved.

EXAMPLE

The following example demonstrates the manufacturing process of a gypsum board of 12.5 mm thickness of the invention. A non-woven fiberglass mat of 110 g/m$^2$ basis weight was coated with a mixture of cement according to DIN 1164, chapter 3.1, and water. After partial setting of the binder the coated non-woven fiberglass mat was dried and wound up in reels. In a customary gypsum wallboard plant a slurry of calcium sulfate hemihydrate stucco, water, accelerator, and foaming agent was deposited on the uncoated side of the lower continuously advancing coated fiberglass mat. An upper, also continuously advancing, coated fiberglass mat of the same kind was laid over the slurry on its uncoated side. The product was passed through forming rolls at which the gypsum slurry penetrated partly into the mat. The strip thus formed was conveyed on a continuous moving belt until the stucco had set and then was cut to boards of 2.50 m length. The boards were passed through a dryer kiln where excess water evaporated.

The following test was carried out:

Gypsum boards of the invention were prepared as in the above example.

The gypsum boards thus produced according to the example were subjected to the usual tests. The following bending strengths have been determined from the breaking loads: 7.2 N/mm$^2$ in machine direction and 3.0 N/mm$^2$ in cross direction. After six months exposure in a conditioning chamber at 20° C./65% R.H. the boards showed bending strengths of 7.8 N/mm$^2$ in machine direction and 3.0 N/mm$^2$ in cross direction.

Test specimens (700 mm in length, 100 mm in width) of 12.5 mm gypsum wallboard and 12.5 mm boards of the present invention, after drying at 40° C., were kept on bearings, the supporting points of which were spaced apart by a distance of 600 mm in a conditioning chamber at 20° C./90% R.H. for 7 days. Then the amount of sagging was determined. It was 4 to 5.5 mm for the gypsum wallboard and 1 to 1.5 mm for the board of the invention.

Also other tests of the gypsum boards of the invention resulted in meeting all requirements. It is even possible to omit a primer over the entire surface, as was heretofore necessary, and to directly apply the final coating to the surface, for example with dispersion dyes, wallpaper, or by adhesion-bonding tiles and plates thereto.

What is claimed is:

1. A gypsum board comprising a gypsum core and at least one lining comprising a coated non-woven fiberglass mat coextensive with said core, wherein only the surface of the non-woven fiberglass mat opposite the gypsum core has been coated with an inorganic binder which has been at least partially set with water, wherein said inorganic binder is selected from the group consisting of quick-setting cement, quick-setting cement mixture and a highly sulfate-resistant cement.

2. The gypsum board according to claim 1, wherein the inorganic binder consists of a mixture which has at least partially set with water and which previously, in the dry state, consisted of at least 37% by weight of a cement, up to 60% by weight of $\alpha$-hemihydrate and 3–10% by weight of ultra-fine silica.

3. The gypsum board according to claim 1, wherein the inorganic binder consists of a mixture which comprises 40 to 60 parts by weight of cement with a low content of aluminate, 40 to 60 parts by weight of $\alpha$-hemihydrate from flue gas gypsum and 3 to 10 parts by weight of reactive $SiO_2$.

4. The gypsum board according to claim 3, wherein the cement contains less than 3% by weight tricalcium aluminate.

* * * * *